(12) United States Patent
Xiong et al.

(10) Patent No.: US 10,721,772 B2
(45) Date of Patent: Jul. 21, 2020

(54) PERFORMING MISSION CRITICAL COMMUNICATIONS AT A USER EQUIPMENT (UE)

(71) Applicant: Intel IP Corporation, Santa Clara, CA (US)

(72) Inventors: Gang Xiong, Portland, OR (US); Hong He, Sunnyvale, CA (US); Debdeep Chatterjee, San Jose, CA (US); Ralf Bendlin, Portland, OR (US); Balkan Kecicioglu, Hillsboro, OR (US)

( * ) Notice: Subject to any disclaimer, the term of this patent is extended or adjusted under 35 U.S.C. 154(b) by 0 days.

(21) Appl. No.: 15/748,157

(22) PCT Filed: Dec. 16, 2015

(86) PCT No.: PCT/US2015/066149
§ 371 (c)(1),
(2) Date: Jan. 26, 2018

(87) PCT Pub. No.: WO2017/023352
PCT Pub. Date: Feb. 9, 2017

(65) Prior Publication Data
US 2018/0227958 A1 Aug. 9, 2018

Related U.S. Application Data

(60) Provisional application No. 62/201,735, filed on Aug. 6, 2015.

(51) Int. Cl.
*H04W 74/08* (2009.01)
*H04W 72/04* (2009.01)
(Continued)

(52) U.S. Cl.
CPC ....... *H04W 74/0833* (2013.01); *H04L 5/0055* (2013.01); *H04W 4/70* (2018.02);
(Continued)

(58) Field of Classification Search
CPC .................................................. H04W 74/0833
See application file for complete search history.

(56) References Cited

U.S. PATENT DOCUMENTS

2012/0320842 A1* 12/2012 Jeong .................. H04W 74/006
370/329
2015/0334702 A1* 11/2015 Ji ...................... H04W 72/1257
370/280
(Continued)

FOREIGN PATENT DOCUMENTS

| WO | 2011087274 A2 | 7/2011 |
| WO | 2016137532 A1 | 9/2016 |
| WO | 2016171767 A1 | 10/2016 |

OTHER PUBLICATIONS

3GPP TSG RAN1 #46bis (R1-062664); Motorola: Synchronized Random Access Channel and Scheduling Request; Seoul, Korea; Oct. 9-13, 2006.
(Continued)

*Primary Examiner* — Jeffrey M Rutkowski
*Assistant Examiner* — Chae S Lee

(57) ABSTRACT

Technology for a user equipment (UE) operable to perform mission critical communications with an eNodeB is disclosed. The UE can transmit a physical random access channel (PRACH) signal to the eNodeB that indicates a mission critical communication to be performed between the UE and the eNodeB. The PRACH signal can be transmitted in accordance with a first transmission time interval (TTI). The UE can receive a random access response (RAR) message from the eNodeB that includes a timing advance (TA) and a resource allocation for the mission critical communication. The RAR message can be transmitted from the eNodeB using a second TTI. The UE can perform the mission critical communication with the eNodeB in an uplink using the TA and the resource allocation indicated in
(Continued)

the RAR message. The mission critical communication can be performed using a physical uplink shared channel (PUSCH) and in accordance with the second TTI.

25 Claims, 11 Drawing Sheets

(51) Int. Cl.
    *H04W 4/70*     (2018.01)
    *H04L 5/00*     (2006.01)
    *H04W 56/00*     (2009.01)
    *H04W 74/00*     (2009.01)
    *H04W 88/02*     (2009.01)

(52) U.S. Cl.
    CPC ..... *H04W 56/001* (2013.01); *H04W 72/0406* (2013.01); *H04W 74/006* (2013.01); *H04W 88/023* (2013.01); *H04L 5/001* (2013.01)

(56) References Cited

U.S. PATENT DOCUMENTS

2017/0279646 A1*   9/2017  Yi ......................... H04L 5/0053
2018/0124829 A1*   5/2018  Lee .......................... H04L 5/00

OTHER PUBLICATIONS

3GPP TS 36.211; V12.0.0; Evolved Universal Terrestrial Radio Access (E-UTRA); Physical channels and modulation (Release 12); Dec. 2013.

3GPP TS 36.300; V12.0.0; Evolved Universal Terrestrial Radio Access (E-UTRA) and Evolved Universal Terrestrial Radio Access Network (E-UTRAN); Overall description; Stage 2 (Release 12); Dec. 2013.

3GPP TS 36.321; V12.0.0; Evolved Universal Terrestrial Radio Access (E-UTRA); Medium Access Control (MAC) protocol specification (Release 12); Dec. 2013.

* cited by examiner

PERFORMING MISSION CRITICAL COMMUNICATIONS AT A USER EQUIPMENT (UE)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 1202.16 standard (e.g., 1202.16e, 1202.16m), which is commonly known to industry groups as WiMAX (Worldwide interoperability for Microwave Access), and the IEEE 1202.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
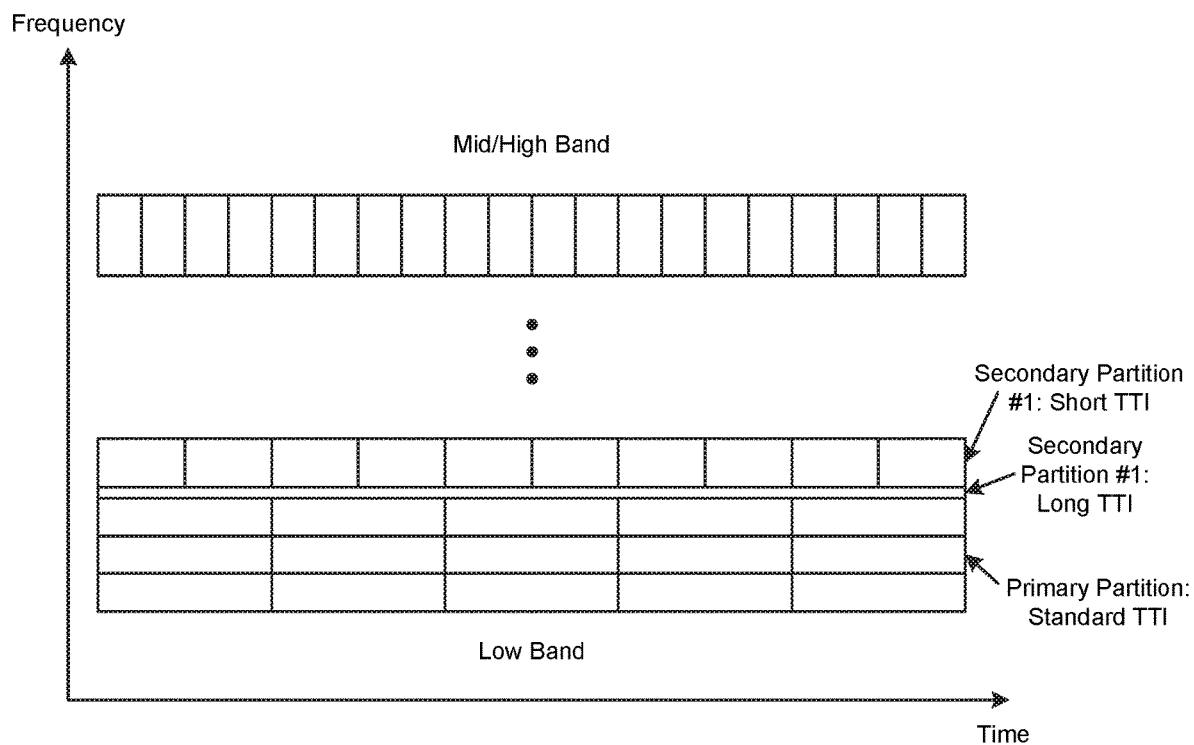
FIG. 1 illustrates a flexible radio access technology (RAT) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The field of mobile communications has evolved significantly from early voice systems to today's highly sophisticated integrated communication platform. 4G Long Term Evolution (LTE) networks are deployed in more than 100 countries to provide services in various spectrum band allocations depending on spectrum regime. Recently, significant momentum has started to build around the idea of a next generation, i.e., fifth generation (5G) wireless communications technology.

A wide range of potential applications and services have been identified for the 5G system. Some examples include (1) enhanced mobile broadband, (2) massive machine type communications (MTC), and (3) ultra-reliable and low latency or mission critical communications. In enhanced mobile broadband, increased data rates is expected to be a key driver in network development and evolution for the 5G system. A peak data rate of more than 10 gigabits per second (Gbps) and a minimum guaranteed user data rate of at least 100 megabits per second (Mbps) are envisioned for the 5G system. With respect to massive MTC, the support of a massive number of Internet of Things (IoT) or MTC devices is expected to be a key feature for the 5G system. MTC devices can be used for a wide variety of applications. MTC devices use low operational power consumption and are expected to communicate with infrequent small burst transmissions. Finally, with respect to ultra-reliable and low latency or mission critical communications, the support of mission critical MTC applications for the 5G system can necessitate a high level of reliable connectivity with guaranteed low latency, availability and reliability-of-service.

FIG. 1 illustrates an exemplary flexible radio access technology (RAT). The flexible RAT, also referred to as a 5G xRAT, can function to address the diverse features of the 5G system, such as the enhanced mobile broadband, massive MTC, and ultra-reliable and low latency or mission critical communications. The flexible RAT can define a unified framework that supports these diverse applications and services. In addition, the flexible RAT can support multiple frequency bands, multiple application/services, licensed/unlicensed frequency, and multiple RATs.

As shown in FIG. 1, the flexible RAT can be represented in two dimensions—frequency and time. Multiple RATs/sub-RATs/partitions or applications in the same frequency resources or frequency bands (or different frequency resources or frequency bands) can be multiplexed using time-division multiplexing (TDM), frequency-division multiplexing (FDM), code-division multiplexing (CDM), or a combination of the above.

In one example, the flexible RAT can include a medium/high frequency band, as well as a low frequency band. In the low frequency band, there can be a primary partition. The primary partition can be in accordance with a standard transmission time interval (TTI). As an example, the standard TTI can be for a Third Generation Partnership Project (3GPP) Long Term Evolution (LTE) Release 8 orthogonal frequency division multiple access (OFDMA) frame structure. The standard TTI can be approximately one millisecond (ms) in duration. Furthermore, in the low frequency band, there can be a first secondary partition and a second secondary partition. The primary partition and the secondary partition can be in both time and frequency. The first secondary partition can be in accordance with a short TTI and the second secondary partition can be in accordance with a long TTI. In general, the short TTI can have a duration that is less than the standard TTI, and the long TTI can have a duration that is greater than the standard TTI. As non-limiting examples, the short TTI can be approximately 0.1 to 0.2 ms in duration, and the long TTI can be approximately 5 ms in duration. In one example, the primary partition in the flexible RAT can be utilized for non-mission critical communications (e.g., voice, data), and the secondary partition in the flexible RAT can be utilized for mission critical communications.

In one example, for a carrier frequency below 6 Gigahertz (GHz), the primary partition can reuse existing LTE numerology, while the secondary partition can be designed to support low latency or mission critical MTC applications. In particular, the short TTI can enable the low latency for mission critical MTC communications. In addition, increased subcarrier spacing, e.g., 75 kilohertz (kHz), can be adopted for the secondary partition. In contrast, a 15 KHz subcarrier spacing can be utilized for the primary partition.

Figure 2:
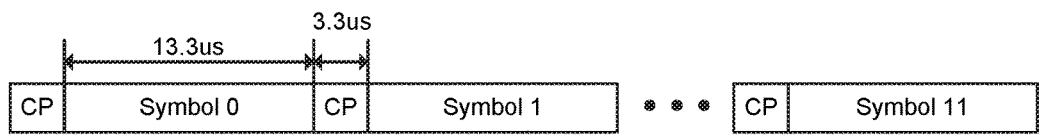
FIG. 2 illustrates a subframe structure for low latency applications in accordance with an example.

FIG. 2 illustrates an exemplary subframe structure for low latency applications. The subframe structure can be for a secondary partition in a low frequency band, and the secondary partition can be associated with a short TTI of approximately 0.1 to 0.2 ms in duration. In one example, the subframe structure for the secondary partition can be based on an orthogonal frequency division multiplexing (OFDM) waveform.

In the example shown in FIG. 2, a 0.2 ms TTI can be achieved. Within one TTI, 12 OFDM symbols can be grouped together (e.g., symbol 0 to symbol 11). Each OFDM symbol can have a duration of 13.3 micro seconds (us). A cyclic prefix (CP) can be inserted between each OFDM symbol. A CP length can be approximately 3.3 us or 512 samples if a sampling rate is 153.6 MHz.

As described in further detail below, a system and method for mission critical communications in a 5G system is described. The mission critical communication can be performed at a user equipment (UE) in a radio resource control (RRC) idle mode. In one example, the procedure can involve a "keep trying" mechanism in which transmissions are repeated to ensure robust communication. The repeated transmissions can provide the ultra-reliability for the mission critical communication. The procedure can involve using a short transmission time interval (TTI) for signaling between the UE and an eNodeB, thereby providing the low latency for the mission critical communication. In one example, dedicated resources can be used for a 5G physical random access channel (xPRACH) transmission that triggers or indicates the mission critical communication. The xPRACH transmission can be combined with a contention based scheduling request (SR). In addition, the procedure can involve information content, resource allocation and transmission schemes for random access response (RAR) messages with respect to the mission critical communication.

Figure 3:
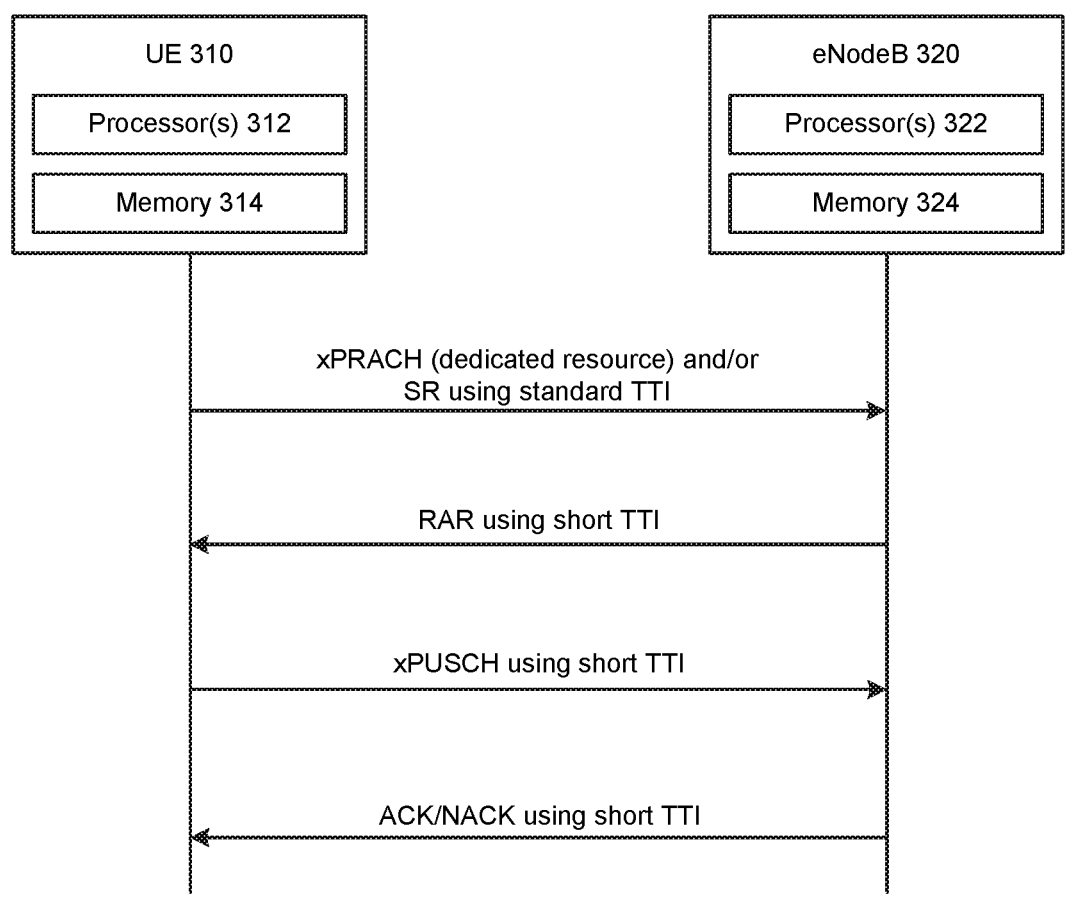
FIG. 3 illustrates a mission critical communication between a user equipment (UE) and an eNodeB in accordance with an example.

FIG. 3 illustrates an exemplary mission critical communication between a user equipment (UE) 310 and an eNodeB 320. In one example, the UE 310 can be a mission critical machine type communication (MTC) device. The UE 310 can initially be in a radio resource control (RRC) idle mode. The UE can include one or more processors 312 and memory 314, and the eNodeB 320 can include one or more processors 322 and memory 324. The mission critical communication between the UE 310 and the eNodeB 320 can include four distinct actions. In a first action, the UE 310 can transmit a fifth generation (5G) physical random access channel (xPRACH) signal to the eNodeB 320 using a dedicated resource to indicate or trigger the mission critical communication. To enable faster uplink access and transmission, the xPRACH signal can be combined together with a scheduling request (SR) message. The xPRACH signal and/or SR message can be transmitted using a standard transmission time interval (TTI) in a primary partition. The standard TTI can be approximately one millisecond (ms) in duration. In addition, the dedicated resource can be represented in the form of an xPRACH preamble signature/sequence, time and frequency resource. In a second action, after successful detection of the xPRACH signal and/or decoding of the SR message, the eNodeB 320 can transmit a random access response (RAR) message using a short TTI in a secondary partition. The short TTI can be approximately 0.1 to 0.2 ms in duration. In general, the short TTI is associated with a time interval that is less than the standard TTI. In one example, the standard TTI can be referred to as a first TTI and the short TTI can be referred to as a second TTI, wherein the second TTI is associated with a time interval that is less than the first TTI. The RAR message may include a timing advance (TA), a resource allocation for an uplink transmission, etc. In a third action, after successfully decoding the RAR message, the UE 310 can transmit uplink data (i.e., the mission critical data) to the eNodeB 320 in a 5G physical uplink shared channel (xPUSCH) using the short TTI in the secondary partition. In other words, the mission critical communication from the UE 310 to the eNodeB 320 is performed using the 5G xPUSCH and the short TTI. The uplink data in the xPUSCH can be transmitted on the allocated resource in the RAR message. In a fourth action, the eNodeB 320 can transmit acknowledgement (ACK) or negative acknowledgement (NACK) information to the UE 310. The ACK/NACK information can be transmitted in a 5G physical downlink control channel (xPDCCH) or a 5G physical hybrid-ARQ indicator channel (xPHICH) using the short TTI in the secondary partition. The four actions involved in performing the mission critical communication are described in further detail below.

In one configuration, a transmitter (e.g., the UE 310 or the eNodeB 320) can keep transmitting the signal until a response is received from a receiver (e.g., the eNodeB 320 or the UE 310). This "keep trying" mechanism can ensure high robustness of the reception, which is essential for the mission critical communication. For instance, in the first action, the UE 310 can continue transmitting the xPRACH signal on the dedicated resource until the UE 310 receives the RAR message from the eNodeB 320. The "keep trying" mechanism can be viewed as an early termination of a repeated transmission. In other words, the transmitter can terminate the repeated transmission when the transmitter receives a response/feedback from the receiver. In addition, a maximum repetition number for each action (e.g., actions 1-4 as described above) can be predefined or configured by higher layers via a 5G master information block (xMIB), a 5G system information block (xSIB) or dedicated RRC signaling. When the transmission reaches the maximum repetition number, the UE 310 can perform a random back-off on the xPRACH signal to re-initiate the mission critical communication.

In one configuration, for each action (e.g., actions 1-4 as described above), the transmitter can repeat the transmission using a fixed number of repetitions (K repetitions). The number of repetitions can be predefined or configured by higher layers via the xMIB, the xSIB or dedicated RRC signaling. In one example, the value of K can be configured as 1, which indicates that no repetition is used for the transmission. When the transmission reaches the fixed repetition number, the UE 310 can perform a random back-off on the xPRACH signal to re-initiate the mission critical communication, or the UE 310 can indicate a random access problem to upper layers in order to trigger corresponding procedure(s).

In one example, a combination of the above options can be considered for the transmission of channels and signals in each action (e.g., actions 1-4 as described above). In particular, the transmitter can keep sending the signal until the transmitter receives the response from the receiver, wherein each transmission occupies K repetitions. Similar to the above option, the number of repetitions (K) in each transmission can be predefined or configured by higher layers via the xMIB, the xSIB or dedicated RRC signaling.

In one configuration, a set of dedicated resources can be allocated for the transmission of the xPRACH signal from the UE to indicate or trigger the mission critical communication. The dedicated xPRACH resources can be multiplexed with resources for other applications (i.e., non-mission critical applications) using TDM or FDM or CDM, or a combination of the above. In addition, the partition of the set of dedicated resources for mission critical communications and the resources for other applications can be predefined or configured by higher layer via the xMIB, the xSIB or dedicated RRC signaling.

In one example, the xPRACH signal can be transmitted using the standard TTI (e.g., 1 ms duration) on the primary partition. Several options can be utilized to allocate the dedicated resource for the transmission of the xPRACH signal. For example, one or a plurality of signatures can be reserved for the xPRACH signal to indicate or trigger the mission critical communication. In addition, to handle the mission critical communication with different applications/services, one or a plurality of dedicated preamble signatures can be reserved for each specific event.

Figure 4:
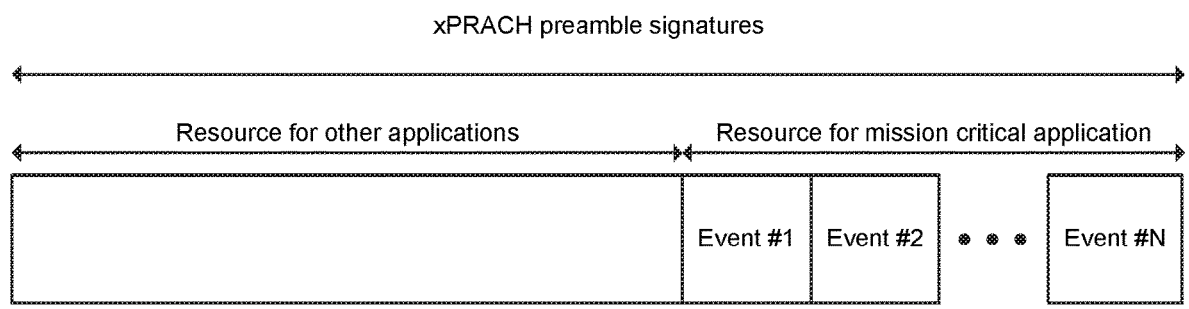
FIG. 4 illustrates a partition of a physical random access channel (PRACH) preamble resource in accordance with an example.

FIG. 4 illustrates an exemplary partition of a physical random access channel (PRACH) preamble resource. The PRACH preamble resource can include a fifth generation (5G) xPRACH preamble resource. The partition of the xPRACH preamble resource can be for mission critical applications, as well as other applications (i.e., non-mission critical applications). In other words, the xPRACH preamble resource can include a first resource for other applications and a second resource for mission critical applications. In addition, the partition of the xPRACH preamble resource can be associated with different applications and/or events. For example, the xPRACH preamble resource size or the number of reserved sequences for each event can be different. For instance, event #1 in the resource for mission critical applications can correspond to a mission critical application for earthquake event, and one preamble signature can be reserved for event #1. Event #2 in the resource for mission critical applications can correspond to a mission-critical Vehicular to Vehicular (V2V) application, and five preamble signatures can be reserved for event #2.

In one example, one or a plurality of frequency resources can be allocated for the xPRACH signal to trigger the mission critical communication. When the UE transmits the xPRACH signal in the dedicated frequency resource, the eNodeB can transmit the corresponding RAR message using the short TTI on the secondary partition. The eNodeB can transmit the corresponding RAR message upon successful detection of xPRACH signal.

In one example, one or a plurality of time resources can be allocated for the xPRACH signal to trigger the mission critical communication. For example, the xPRACH signal for other applications (i.e., non-mission critical applications) can be transmitted in subframe 0, 2, 4, 6, 8 within one frame, while the xPRACH signal used to trigger the mission critical communication can be transmitted in subframe 1, 3, 5, 7, 9 within one frame.

In one example, a combination of TDM and/or FDM and/or CDM based multiplexed schemes can be used to separate the resource for mission critical applications and other applications (i.e., non-mission critical applications). For example, a combination of FDM and CDM multiplexing schemes can be utilized, i.e., one additional frequency resource can be reserved for mission critical applications, and within this dedicated frequency resource, different mission critical applications/services can be separated using different xPRACH preamble signatures.

In another example, a combination of TDM and CDM multiplexing schemes can be utilized. The xPRACH signal for the other application (i.e., a non-mission critical application) can be transmitted in subframe 0, 2, 4, 6, 8 within one frame, while the xPRACH signal used to trigger the mission critical communication can be transmitted in subframe 1, 3, 5, 7, 9 within one frame. Further, different mission critical applications/services can be separated using different xPRACH preamble signatures.

In one example, with respect to ultra-reliable and low latency communications, multiple mission critical devices can operate as a "single frequency network" (SFN), which can improve a link level performance for mission critical communication. In this case, the eNodeB can treat multiple mission critical devices as a single mission critical device. For example, the eNodeB can transmit a single RAR message to multiple UEs, and in response, multiple UEs can transmit uplink data (i.e., mission critical data) simultaneously to the eNodeB on the same time and frequency resource.

In one example, in order to differentiate a typical operation from a "single frequency network" type of operation, different xPRACH resources can be allocated. For example, one event ID or dedicated xPRACH signature can be allocated for the "single frequency network" type of operation. In addition, when repeated transmissions of the xPRACH preamble are used, a starting subframe of the repeated xPRACH transmission can be predefined or configured by higher layers, thereby causing the eNodeB to perform efficient detection of the repeated xPRACH signal.

A more detailed description is now provided with respect to the first action shown in FIG. 3, in which the UE can transmit the 5G xPRACH signal and/or SR message to the eNodeB using dedicated resources to indicate or trigger the machine critical communication. The xPRACH signal transmission can be combined with a contention based scheduling request (SR) message to allow uplink access in a reduced amount of time, thereby fulfilling the latency constraints for mission critical communications. The contention based SR message can include the UE ID and buffer status report to enable uplink access in the reduced amount of time.

For mission critical applications, the SR message can be transmitted from the UE to the eNodeB as part of a random access channel (RACH) procedure, which allows for a reduction in connection establishment delay as compared to existing LTE systems. The SR message can be a fixed size and can include several parameters/fields. The SR message can include a mission critical MTC device ID, which can be the same as the UE ID or a different ID. The SR message can include an event ID to indicate an access cause when a same set of xPRACH sequences are allocated for multiple applications/services. The event ID can be included in the SR message to expedite access for the UE. The SR message can include a mission critical MTC device capability, which can include mission critical specific UE radio access capability information, such as carrier aggregation (CA) capability, i.e., component carrier (CC) index(es) that are supported by the UE (e.g., the mission critical MTC device), supported multiple input multiple output (MIMO) capability, etc. The SR message can include a resource request and modulation and coding scheme (MCS) for an uplink transmission (e.g., mission critical data) from the UE. For example, the SR message can include the resource request in the time and frequency domain, e.g., physical resource block (PRB) index or numbers within one band, or symbol/slot/subframe/frame index or CC index(es) used for the uplink transmission. Alternatively, the UE can indicate the total amount of data for mission critical application and/or channel state information (CSI)/reference signaling measurements, which can subsequently be used for downlink MCS selection and open loop power control calculation.

In one example, when the resource request of PRB index and MCS are included in the SR message, the eNodeB can feedback 1 bit ACK/NACK information to the UE (or mission critical MTC device). Upon successful ACK detection, the UE can use the resource indicated in the SR message for uplink data transmission based on a predefined timing following a subframe in which the ACK/NACK information is detected.

In one example, the "keep trying" mechanism or repeated transmission can be employed when transmitting the xPRACH signal and/or SR message to the eNodeB. The same xPRACH preamble signature and the same SR information can be used for the transmission of the xPRACH signal and the SR message during the repetition, respectively. In addition, the SR message can occupy the resource allocated for the SR transmission to further enhance the link level performance.

In one example, UEs may not have the xPRACH/SR repetition capability, or the function may not be configured at the UE by the eNodeB. In this case, different xPRACH and/or SR resources can be used with respect to (1) an initial transmission that is shared among all UEs and (2) subsequent repeated transmission that is dedicated for UEs enabled with the xPRACH/SR repetition capability. In one example, the resource for the initial transmission of the xPRACH signal and SR message can be selected by the UE within a contention-based resource region, while the resources for subsequent repeated transmissions can be configured by higher-layers (e.g., broadcasted in the xSIB) within a contention-free resource region on the same partition or a different partition.

In one example, available sets of xPRACH or SR resources reserved for the UE (e.g., a mission critical MTC device) can be divided into two different regions—a first region can be used for the xPRACH/SR transmission repetition and the second region can be reserved for the xPRACH/SR transmission without repetition. More specifically, an xPRACH signal or SR message can be repeatedly transmitted on a configurable or fixed consecutive xPRACH or SR resources within the first region according to a known pattern (e.g., TDM, CDM or FDM). The number of repetition times can be predefined or configured by higher layers for an individual UE. In addition, one-to-one mapping between the xPRACH repetition level and the xPRACH/SR resource set can be utilized. The UE can select an xPRACH/SR repetition level based on a measurement, such as a reference signal received power (RSRP), and the UE can transmit the xPRACH/SR using the xPRACH/SR resources set according to the selected xPRACH/SR repetition level.

Figure 5:
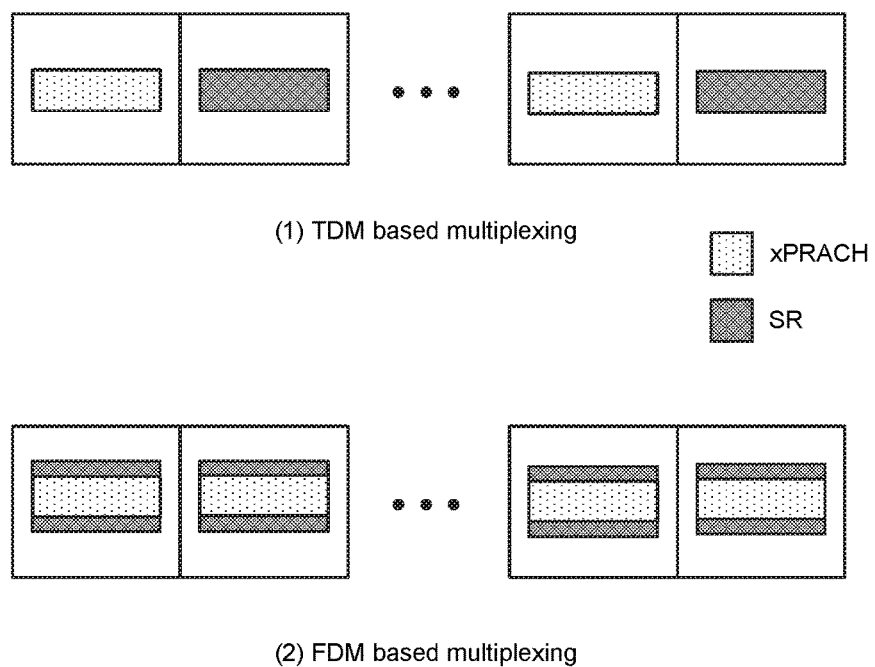
FIG. 5 illustrates a multiplexing of a physical random access channel (PRACH) signal and a scheduling request (SR) message in a repeated transmission in accordance with an example.

FIG. 5 illustrates an exemplary multiplexing of a physical random access channel (PRACH) signal and a scheduling request (SR) message in a repeated transmission. The PRACH signal can include a fifth generation (5G) xPRACH signal. Various multiplexing mechanisms, such as time division multiplexing (TDM) or frequency division multiplexing (FDM), can be applied to the xPRACH signal and the SR message. As shown in FIG. 5, TDM multiplexing can be used for repeated transmissions of the xPRACH signal and the SR message, or FDM multiplexing can be used for repeated transmissions of the xPRACH signal and the SR message. In other words, TDM and FDM based multiplexing mechanisms can be applied to the "keep trying" mechanism for repeated transmissions. In addition, the SR message can be transmitted using all the available resource to achieve ultra-reliable communication.

In one example, with respect to transmission power control mechanism for the transmission of the xPRACH signal and/or the SR message, several options can be used. In one example, when (re)transmitting the xPRACH signal and/or SR message, a maximum transmit power can be used to ensure robust detection at the eNodeB. In another example, an existing power control mechanism can be applied for the transmission and retransmission of the xPRACH signal and/or SR message. In particular, for an initial transmission, the xPRACH transmission power can be set to an initial PRACH power, while for the retransmission, power ramping can be used to increase the actual transmission power.

In yet another example with respect to transmission power control, repetition level ramping can be applied for the transmission and retransmission of the xPRACH signal and/or SR message. Further, the repetition level ramping mechanism can be combined in conjunction with power ramping to further improve the performance. In one example, the repetition level can be doubled for each retransmission. In the initial transmission, the repetition level can be defined as K, while in the first retransmission, the repetition level can be set to 2K, etc. Additionally, if power ramping is applied on top of the repetition level ramping, the power ramping can be defined so as to account for an increase in the repetition level. Specifically, the power level for the first attempt at a subsequent repetition level can be reduced by a factor of 10*log(numRepL/numRepL−1), wherein numRepL and numRepL−1 are the number of repetitions configured for repetition levels L and L−1, respectively.

A more detailed description is now provided with respect to the second action shown in FIG. 3, in which the eNodeB can transmit the RAR message to the UE using the short TTI. After identifying the mission critical event based on detection of the xPRACH signal, the eNodeB can dynamically allocate the resource in a secondary partition, and the eNodeB can transmit the corresponding RAR message using the short TTI.

For mission critical MTC applications, a fixed relationship can be defined between the time (e.g., a last repetition/retransmission) of the xPRACH transmission and a time of the first transmission of the xPDCCH/xPDSCH signal (either scheduling or carrying the RAR message). Additionally, the frequency resource for the xPDCCH (if xPDCCH is not wideband) or xPDSCH can be determined as a function of at least the preamble sequence of the detected xPRACH signal, and possibly also the frequency location of the detected xPRACH signal. If additional flexibility is desired at the eNodeB, then for time-domain scheduling of the RAR message, a short RAR window can be defined in which the UE monitors for the first transmission of the xPDCCH/xPDSCH signal with the RAR message.

Figure 6:
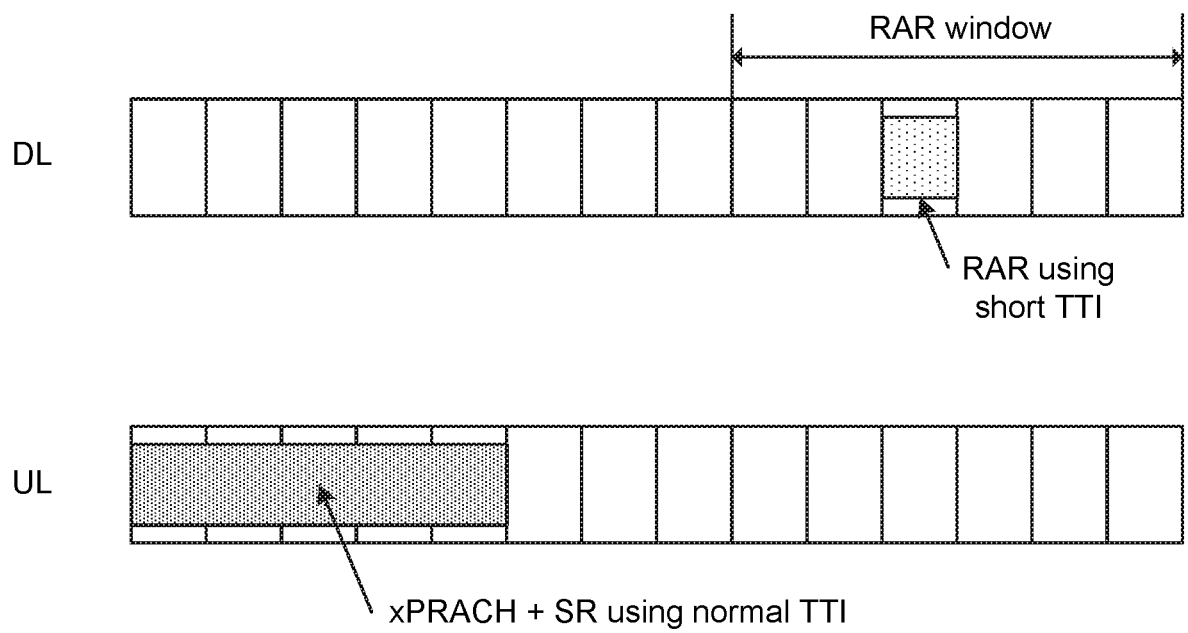
FIG. 6 illustrates a random access response (RAR) window for repeated transmissions between a user equipment (UE) and an eNodeB in accordance with an example.

FIG. 6 illustrates an exemplary random access response (RAR) window for repeated transmissions between a user equipment (UE) and an eNodeB. When repeated transmissions are used for the xPRACH signal and/or SR message, the RAR window can be defined such that the UE (e.g., a mission critical MTC device) can monitor for the RAR message within the RAR window. As shown in FIG. 6, the xPRACH signal and SR message can be transmitted in an uplink in accordance with a standard TTI (e.g., 1 ms in duration). After transmission of the xPRACH signal and SR message, the RAR window can be defined. During the RAR window, the UE can monitor a downlink for the RAR message. The UE can detect the RAR message during the RAR message, wherein the RAR message is transmitted in accordance with a short TTI. In one example, the position of the RAR window can be predefined or configured by higher layer via the xMIB, the xSIB or dedicated RRC signaling. In addition, the starting position of the RAR window can be defined relative to the starting of the last subframe of the repeated xPRACH signal and/or SR message transmission.

Figure 7A:
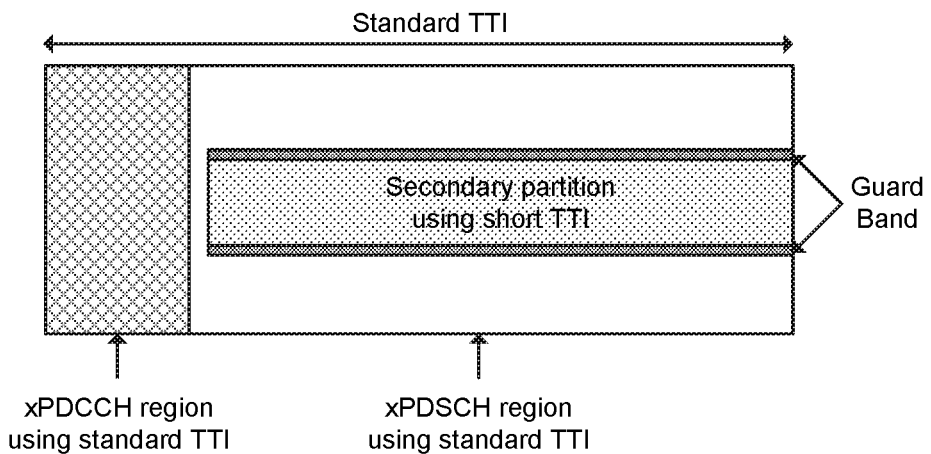
FIGS. 7A to 7C illustrates a resource allocation of a primary partition and a secondary partition within a transmission time interval (TTI) in accordance with an example.
Figure 7B:
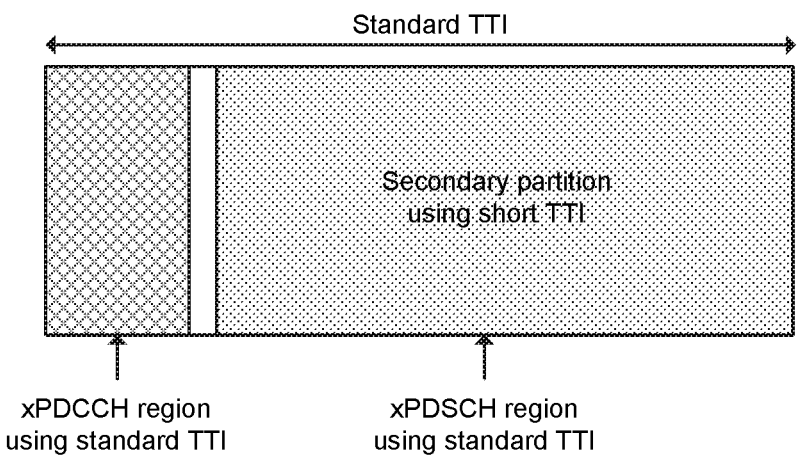
Figure 7C:
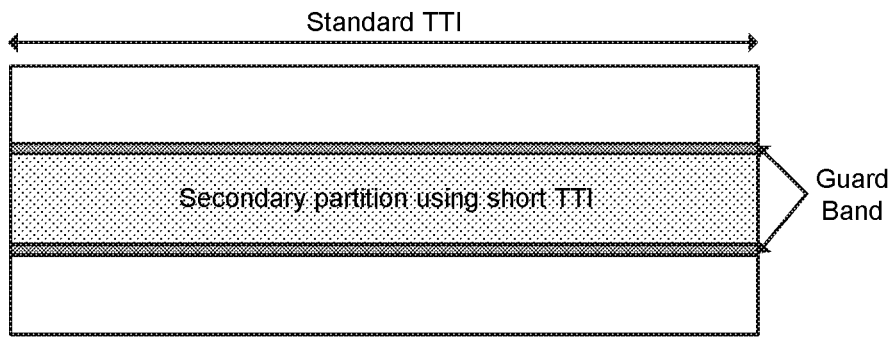

FIGS. 7A to 7C illustrates exemplary resource allocations of a primary partition and a secondary partition within a transmission time interval (TTI). The TTI can be a standard TTI with a duration of one millisecond (ms). Guard bands can be inserted between the primary and secondary partitions in a frequency domain in order to reduce inter-carrier interference.

As shown in FIG. 7A, a secondary partition using a short TTI (e.g., 0.1 to 0.2 ms) can be allocated after an xPDCCH region. The xPDCCH region can be in the primary partition using the standard TTI. When different numerologies, e.g., subcarrier spacing, are used for the primary and secondary partitions, a guard time may be inserted between the xPDCCH region using the standard TTI and the secondary partition using the short TTI. This option may avoid traffic interruption for the primary partition, as the eNodeB can schedule the downlink and uplink transmission via the xPDCCH within the primary partition.

As shown in FIG. 7B, a secondary partition using a short TTI (e.g., 0.1 to 0.2 ms) can be allocated after an xPDCCH region. The xPDCCH region can be in the primary partition using the standard TTI. Further, the secondary partition can occupy a full system bandwidth to enhance the link level performance. In this approach, guard times may not be inserted between the xPDCCH region using the standard TTI and the secondary partition using the short TTI.

As shown in FIG. 7C, a secondary partition using a short TTI (e.g., 0.1 to 0.2 ms) can span a standard TTI (e.g., 1 ms). In this approach, the secondary partition can occupy a full system bandwidth to enhance the link level performance. In addition, a guard time may be inserted to reduce interference in a primary partition.

In one example, the resource allocation for the secondary partition can be predefined, or broadcasted in a mission critical specific xSIB message, or indicated in a downlink control information (DCI) format in the xPDCCH using the standard TTI in the primary partition. In the latter case, the UE (e.g., a mission critical MTC device) can monitor the xPDCCH with a cyclic redundancy check (CRC) scrambled by an existing random-access radio network temporary identifier (RA-RNTI) or a newly defined RA-RNTI for mission critical applications. The RA-RNTI can be predefined in the specification or defined as a function of at least one of: the time index, frequency index, preamble sequence, and repetition level used for the detected xPRACH transmission. Upon successful decoding of the xPDCCH signal, the UE can switch to a short TTI mode and decode the RAR message within the secondary partition.

Figure 8:
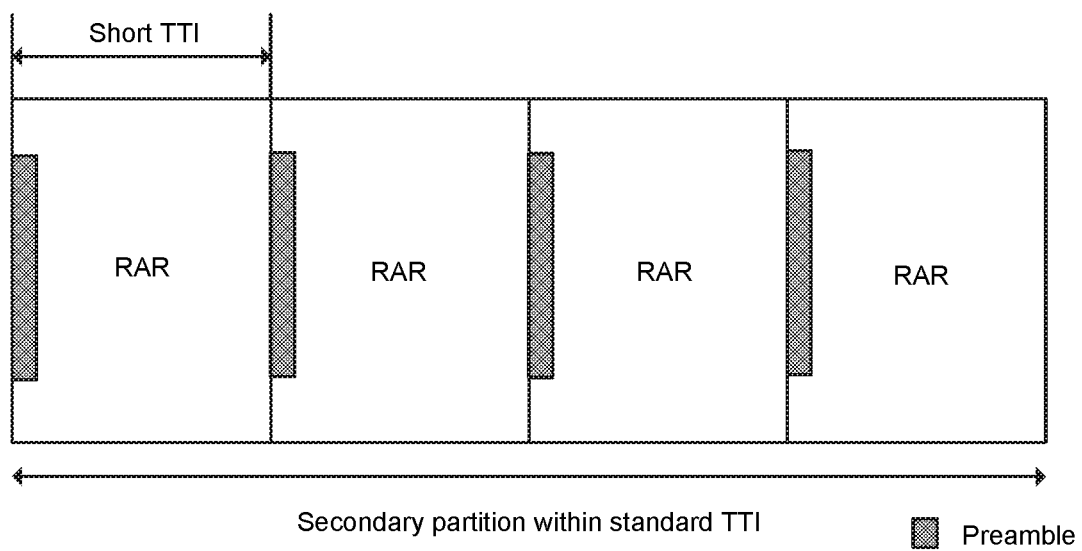
FIG. 8 illustrates a repeated transmission of a random access response (RAR) message using a short transmission time interval (TTI) in accordance with an example.

FIG. 8 illustrates an exemplary repeated transmission of a random access response (RAR) message using a short transmission time interval (TTI). The "keep trying" mechanism or repeated transmissions of the RAR message can be used to improve the link level performance. The repeated RAR transmissions using the short TTI can occur within a secondary partition used for mission critical communication. As shown in FIG. 8, a preamble can be inserted before each transmission of the RAR message to improve a downlink synchronization accuracy, which is useful in view of the higher sampling rate used for the short TTI with large subcarrier spacing (e.g., 15 KHz). The preamble can utilize similar principles as compared to the 5G downlink synchronization channel (xSCH). To differentiate the preamble from the xSCH, independent root sequences can be employed when Zadoff-Chu (ZC) sequences are used for the xSCH.

In one example, the RAR message can include various parameters. For example, the RAR message can include a timing advance (TA). The eNodeB can estimate an initial TA from the xPRACH signal sent by the UE. The RAR message can include an UL grant for a subsequent uplink transmission. In addition, the UL grant can include a resource allocation of the secondary partition used for the subsequent uplink transmission. When the UE (e.g., a mission critical MTC device) supports carrier aggregation (CA), the resource allocation for multiple component carriers (CCs)

can be included in the uplink grant. The UL grant can include a modulation and coding scheme (MCS) and a power control parameter for the subsequent uplink transmission, as well as the number of repetitions used for the RAR transmission. In one example, the RAR message can include a mission critical MTC device ID, which can be used for contention resolution. The RAR message can include an event ID, which can be obtained from the SR message and used for contention resolution. In addition, the RAR message can include a random access preamble ID that is useful for contention resolution. The random access preamble ID can include a preamble index for the xPRACH transmission.

In one example, the RAR message can be transmitted in the secondary partition using the short TTI either: (1) on the xPDSCH scheduled by the xPDCCH, or (2) using the xPDCCH directly, or (3) using the xPDSCH directly. With respect to the first option, the xPDCCH can indicate the resource allocation and MCS for the transmission of the xPDSCH signal, while the xPDSCH carries the RAR message. With respect to the second option, the RAR message can be transmitted via the xPDCCH. In this case, the UE (e.g., a mission critical MTC device) can monitor the xPDCCH with the CRC scrambled by the RA-RNTI. With respect to the third option, the RAR message can be transmitted via the xPDSCH using the short TTI. When repeated transmissions or the "keep trying" mechanism is employed for the RAR message, TTI bundling and a predefined redundancy version (RV) pattern (e.g., [0 2 3 1]) can be used when turbo coding is adopted. Further, a scrambling seed for the transmission of the xPDSCH signal can be defined as a function of the RA-RNTI or a group ID with respect to a "single frequency network" (SFN) type of operation. In one example, the group ID can be specified as the event ID.

In one example, the UE (e.g., a mission critical MTC device) can monitor for the xPDSCH signal using fixed and known values of the MCS and a transport block size (TBS). If a UE processing complexity increase can be accommodated for mission critical devices, then a limited number of options for MCS and TBS for the xPDSCH can be configured, from which the UE can perform blind detection.

A more detailed description is now provided with respect to the third action shown in FIG. 3, in which the UE can transmit uplink data (i.e., mission critical data) to the eNodeB using the short TTI. A resource allocation for the uplink data transmission can be indicated in the RAR message. In particular, the resource allocation can be associated with a secondary partition to be used for the uplink data transmission. Further, a scrambling seed for a transmission of the xPUSCH signal can be defined as a function of a mission critical MTC device ID or a group ID with respect to a "single frequency network" type of operation. In one example, the group ID can be specified as the event ID.

When the repeated transmission is used for the uplink transmission, a gap between the end of a last RAR transmission and a starting subframe of the uplink transmission can be predefined or configured by higher layers via the xMIB, the xSIB or dedicated RRC signaling. Alternatively, to allow additional flexibility, a delay parameter can be indicated in the UL grant of the RAR message, wherein the delay parameter can be of the order of one or more standard or short TTI(s).

In one example, to improve the robustness of the uplink transmission, the same information can be transmitted on multiple component carriers (CC) simultaneously, or transmitted repeatedly within a CC to fulfil the reliability constraint of the mission critical communication. Further, TTI bundling with a predefined redundancy version (RV) pattern can be employed for performance enhancement. For mission critical applications with small data packet transmissions, tail biting convolution coding (TBCC) can be used as a forward error correction (FEC) scheme as opposed to turbo coding.

A more detailed description is now provided with respect to the fourth action shown in FIG. 3, in which the eNodeB can transmit ACK/NACK information to the UE using the short TTI. The ACK/NACK can be transmitted via the xPDCCH or the xPHICH using the short TTI on the secondary partition. When repeated transmission are used for the ACK/NACK transmission, a gap between the end of a last uplink data transmission and a starting subframe of the ACK/NACK transmission can be predefined or configured by higher layers via the xMIB, the xSIB or dedicated RRC signaling.

In one example, when a NACK is received or an ACK is not received, the UE (e.g., a mission critical MTC device) can perform a retransmission of the uplink data. When a maximum number of retransmission is reached, the UE can perform a random back-off and re-initiate the procedure for mission critical communication. Alternatively, assuming that an uplink synchronization has been established via a mission critical random access procedure, the UE can transmit a scheduling request (SR) using the short TTI on the secondary partition at a next available SR opportunity. In one example, periodically occurring SR opportunities can be defined in the secondary partition. The SR transmission can be based on a physical structure of the xPUSCH or xPUCCH, which are adapted for transmissions using short TTIs. The configuration of the SR opportunities in the secondary partition can be pre-defined or broadcasted using the xSIB. Alternatively, the configuration of the SR opportunities can be indicated via a combination of broadcasted information of system level configurations and UE-specific signaling of the actual configured SR resource periodicity carried in the RAR message.

In one example, with respect to the "single frequency network (SFN)" type of operation, multiple UEs that are closely co-located (i.e., located within a defined distance from each other) can transmit the xPRACH signal on the same xPRACH resource using the same xPRACH preamble, which can improve the xPRACH detection performance. In response to receiving the xPRACH signal from multiple UEs, the eNodeB can transmit a single RAR message that targets the multiple UEs. In addition, when one or more UEs successfully receive the RAR message, the UEs can transmit the xPUSCH signal simultaneously on the same resource, which can achieve SFN gain.

In one configuration, a system and method of ultra-reliable and low latency communications for a fifth generation (5G) system is described. A user equipment (UE) can transmit, to an eNodeB, a 5G Physical Random Access Channel (xPRACH) and/or a scheduling request (SR) message to trigger a mission critical communication. The xPRACH and/or SR can be transmitted on a dedicated resource using a standard transmission time interval (TTI) in a primary partition. The UE can receive a random access response (RAR) using a short TTI in a secondary partition. The UE can transmit uplink data to the eNodeB in a 5G physical uplink shared channel (xPUSCH) using the short TTI in the secondary partition. The UE can receive, from the eNodeB, acknowledgement (ACK) or negative acknowledgement (NACK) information in a 5G physical downlink control channel (xPDCCH) or a 5G Physical Hybrid-ARQ Indicator Channel (xPHICH) using the short TTI in the secondary partition.

In one configuration, a keep trying mechanism is employed between the UE and the eNodeB for ultra-reliable and low latency communication. A transmitter (e.g., the UE or eNodeB) can keep sending a signal until a response is received from a receiver (e.g., the eNodeB or UE). A maximum repetition number for each transmission can be predefined or configured by higher layers via a 5G master information block (xMIB), a 5G system information block (xSIB) or dedicated RRC signaling.

In one configuration, a transmitter (e.g., the UE or eNodeB) can repeat the transmission using a fixed number of repetitions. The fixed number of repetitions can be predefined or configured by higher layers via the xMIB, the xSIB or dedicated RRC signaling.

In one configuration, a transmitter (e.g., the UE or eNodeB) can keep sending the signal until a response is received from a receiver (e.g., the eNodeB or UE). In addition, each transmission can occupy K repetitions, and K is predefined or configured by higher layers via the xMIB, the xSIB or dedicated RRC signaling.

In one configuration, a set of dedicated xPRACH resources for mission critical communications can be multiplexed with resources for non-mission critical applications using time division multiplexing (TDM) or frequency division multiplexing (FDM) or code division multiplexing (CDM) or a combination of above. In addition, a partition configuration can be predefined or configured by higher layer via the xMIB, the xSIB or dedicated RRC signaling.

In one configuration, one or more signatures can be reserved for the xPRACH to trigger the mission critical communication.

In one configuration, one or more time resources can be reserved for the xPRACH to trigger the mission critical communication.

In one configuration, one or more frequency resources can be reserved for the xPRACH to trigger the mission critical communication.

In one configuration, one or more xPRACH signatures or time resources or frequency resources can be reserved for "single frequency network" type of operations.

In one configuration, the SR message can have a fixed size, and the SR can include at least the following parameters or fields: a mission critical machine type communication (MTC) device identifier (ID), an event ID, a mission critical MTC device capability, a resource request, and a modulation and coding scheme (MCS) for transmission of the uplink data from the UE to the eNodeB. In addition, the resource request can include a physical resource block (PRB) index or numbers within one band, or symbol/slot/subframe/frame index or component carrier (CC) index(es) used for the transmission of the uplink data.

In one configuration, a resource for an initial transmission of the xPRACH and SR is selected by a given UE within a contention-based resource region, and resources for subsequent repeated transmissions can be configured by higher-layers (e.g. broadcasted in the xSIB) within a contention-free resource region on a same partition or a different partition.

In one configuration, a maximum transmit power can be utilized for the transmission and retransmission of the xPRACH signal and/or SR message.

In one configuration, existing power control mechanisms can be applied for the transmission and retransmission of the xPRACH signal and/or SR message.

In one configuration, repetition level ramping can be applied for the transmission and retransmission of the xPRACH signal and/or SR message.

In one configuration, the UE (e.g., a mission critical MTC device) can monitor a random access response (RAR) message within a RAR window. A position of the RAR window can be predefined or configured by higher layers via the xMIB, the xSIB or dedicated RRC signaling.

In one configuration, a resource allocation of a secondary partition or a RAR transmission is predefined, or broadcasted in a xSIB message, or indicated in a downlink control information (DCI) format in the xPDCCH using a standard TTI in the primary partition.

In one configuration, the secondary partition can be allocated after the xPDCCH region in the primary partition using the standard TTI (e.g., 1 ms). In addition, the secondary partition can occupy a full system bandwidth.

In one configuration, the secondary partition can span a standard TTI (e.g., 1 ms). In addition, the secondary partition can occupy a full system bandwidth.

In one configuration, a preamble can be inserted prior to the transmission of the RAR message. The preamble can be based on a 5G downlink synchronization channel (xSCH).

In one configuration, the RAR message can include the following parameters or fields: a timing advance command (TA), an uplink grant, a mission critical MTC device ID, an event ID and a random access preamble ID. The uplink grant can further include a resource allocation of the secondary partition used for a subsequent uplink transmission.

In one configuration, the RAR message can be transmitted via the xPDSCH using a short TTI. When a repeated transmission mechanism (or "keep trying" mechanism) is employed, TTI bundling and a predefined redundancy version (RV) pattern can be used for the transmission of the RAR message when turbo coding is adopted. In addition, with respect to a "single frequency network" type of operation, a scrambling seed for the transmission of the xPDSCH can be defined as a function of a random access radio network temporary identifier (RA-RNTI), a group ID or an event ID.

In one configuration, the RAR message can be transmitted via the xPDCCH. The UE (e.g., a mission critical MTC device) can monitor the xPDCCH with a cyclic redundancy check (CRC) scrambled by an RA-RNTI.

In one configuration, the RAR message can be transmitted via the xPDSCH scheduled by the xPDCCH.

In one configuration, a gap between an end of a last RAR transmission and a starting subframe of the uplink transmission can be predefined or configured by higher layers via the xMIB, the xSIB or dedicated RRC signaling. In addition, a delay parameter in the order of standard or short TTI can indicated in the UL grant of the RAR message.

In one configuration, for the uplink transmission, the same information can be transmitted on multiple component carriers (CC) simultaneously or transmitted repeatedly over multiple sets of PRBs within a CC. In one example, TTI bundling with a predefined redundancy version (RV) pattern can be employed for the uplink transmission. In another example, a scrambling seed for the transmission of the xPUSCH can be defined as a function of a mission critical MTC device ID or a group ID for a "single frequency network" type of operation.

In one configuration, a gap between an end of the uplink data transmission and a starting subframe of the ACK/NACK transmission can be predefined or configured by higher layers via the xMIB, the xSIB or dedicated RRC signaling.

In one configuration, when a negative acknowledgement (NACK) is received or an acknowledgement (ACK) is not received, the UE (e.g., a mission critical MTC device) can perform a retransmission of the uplink data. When a maximum number of retransmission is reached, the UE can perform a random back-off and re-initiate the procedure for mission critical communication.

Figure 9:
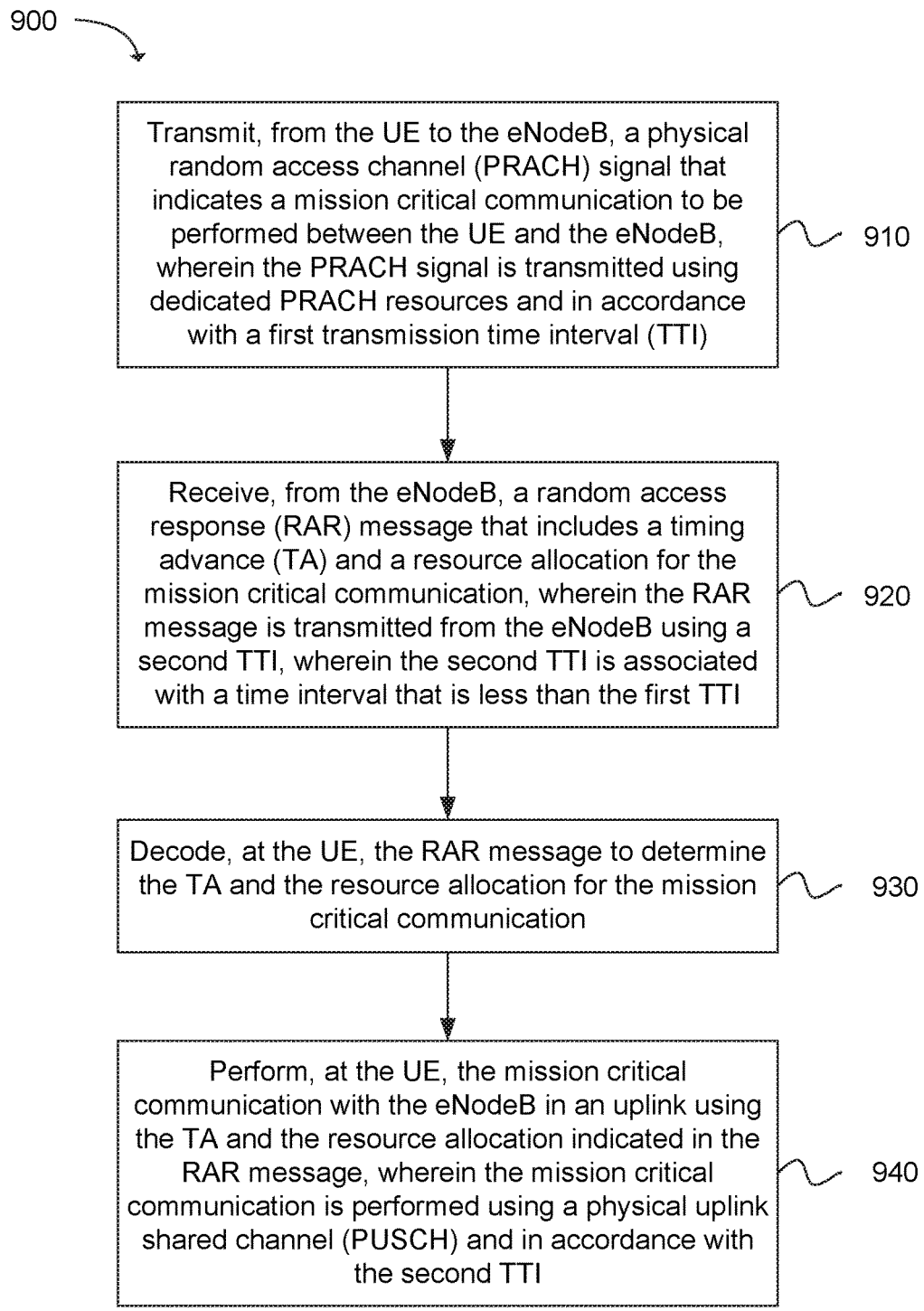
FIG. 9 depicts functionality of a user equipment (UE) operable to perform mission critical communications with an eNodeB in accordance with an example.

Another example provides functionality 900 of a user equipment (UE) operable to perform mission critical communications with an eNodeB, as shown in the flow chart in FIG. 9. The UE can comprise one or more processors and memory configured to: transmit, from the UE to the eNodeB, a physical random access channel (PRACH) signal that indicates a mission critical communication to be performed between the UE and the eNodeB, wherein the PRACH signal is transmitted using dedicated PRACH resources and in accordance with a first transmission time interval (TTI), as in block 910. The UE can comprise one or more processors and memory configured to: receive, from the eNodeB, a random access response (RAR) message that includes a timing advance (TA) and a resource allocation for the mission critical communication, wherein the RAR message is transmitted from the eNodeB using a second TTI, wherein the second TTI is associated with a time interval that is less than the first TTI, as in block 920. The UE can comprise one or more processors and memory configured to: decode, at the UE, the RAR message to determine the TA and the resource allocation for the mission critical communication, as in block 930. The UE can comprise one or more processors and memory configured to: perform, at the UE, the mission critical communication with the eNodeB in an uplink using the TA and the resource allocation indicated in the RAR message, wherein the mission critical communication is performed using a physical uplink shared channel (PUSCH) and in accordance with the second TTI, as in block 940.

Figure 10:
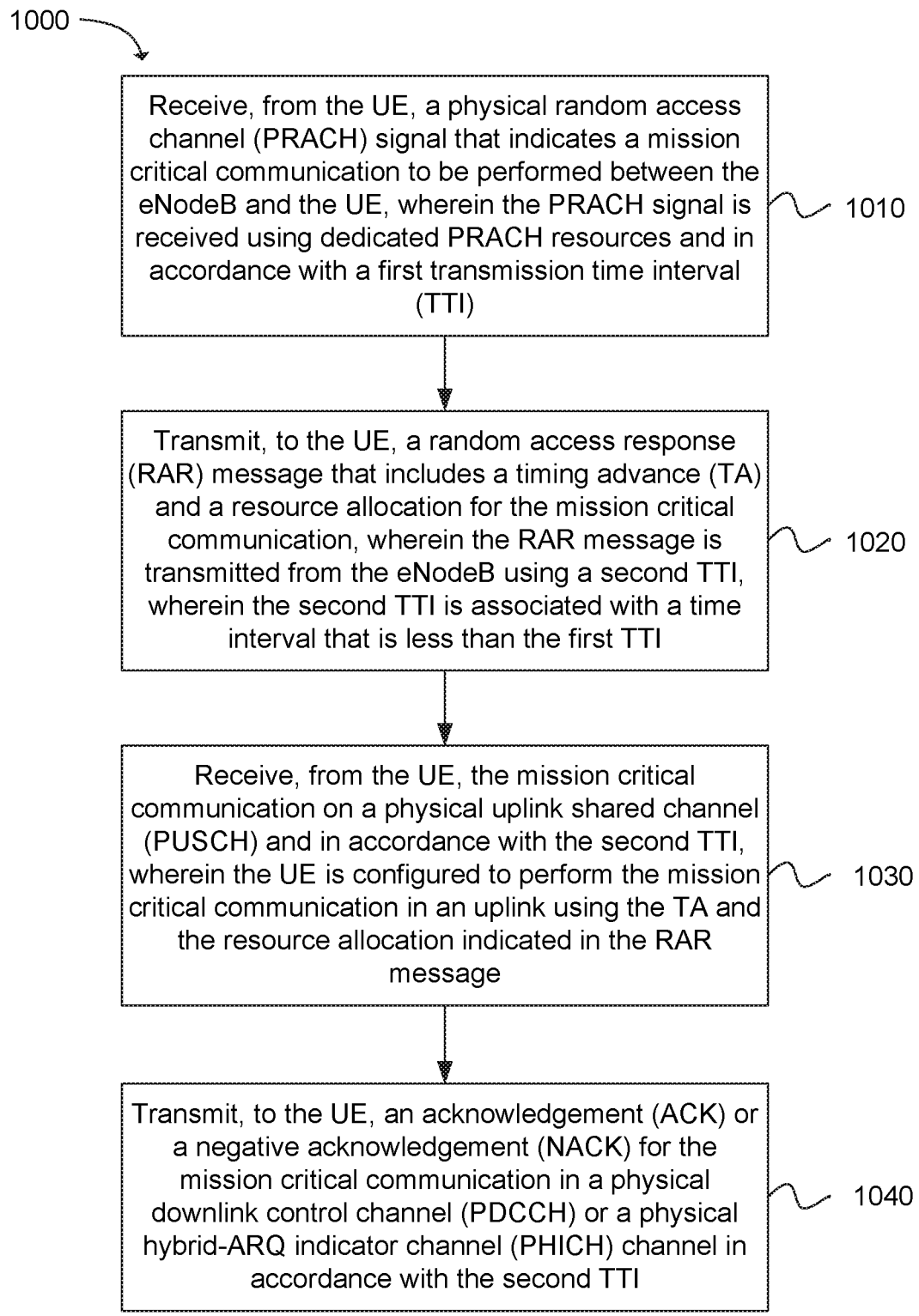
FIG. 10 depicts functionality of a base station operable to receive mission critical communications from a user equipment (UE) in accordance with an example.

Another example provides functionality 1000 of a base station operable to receive mission critical communications from a user equipment (UE), as shown in the flow chart in FIG. 10. The base station can comprise one or more processors and memory configured to: receive, from the UE, a physical random access channel (PRACH) signal that indicates a mission critical communication to be performed between the eNodeB and the UE, wherein the PRACH signal is received using dedicated PRACH resources and in accordance with a first transmission time interval (TTI), as in block 1010. The base station can comprise one or more processors and memory configured to: transmit, to the UE, a random access response (RAR) message that includes a timing advance (TA) and a resource allocation for the mission critical communication, wherein the RAR message is transmitted from the eNodeB using a second TTI, wherein the second TTI is associated with a time interval that is less than the first TTI, as in block 1020. The base station can comprise one or more processors and memory configured to: receive, from the UE, the mission critical communication on a physical uplink shared channel (PUSCH) and in accordance with the second TTI, wherein the UE is configured to perform the mission critical communication in an uplink using the TA and the resource allocation indicated in the RAR message, as in block 1030. The base station can comprise one or more processors and memory configured to: transmit, to the UE, an acknowledgement (ACK) or a negative acknowledgement (NACK) for the mission critical communication in a physical downlink control channel (PDCCH) or a physical hybrid-ARQ indicator channel (PHICH) channel in accordance with the second TTI, as in block 1040.

Figure 11:
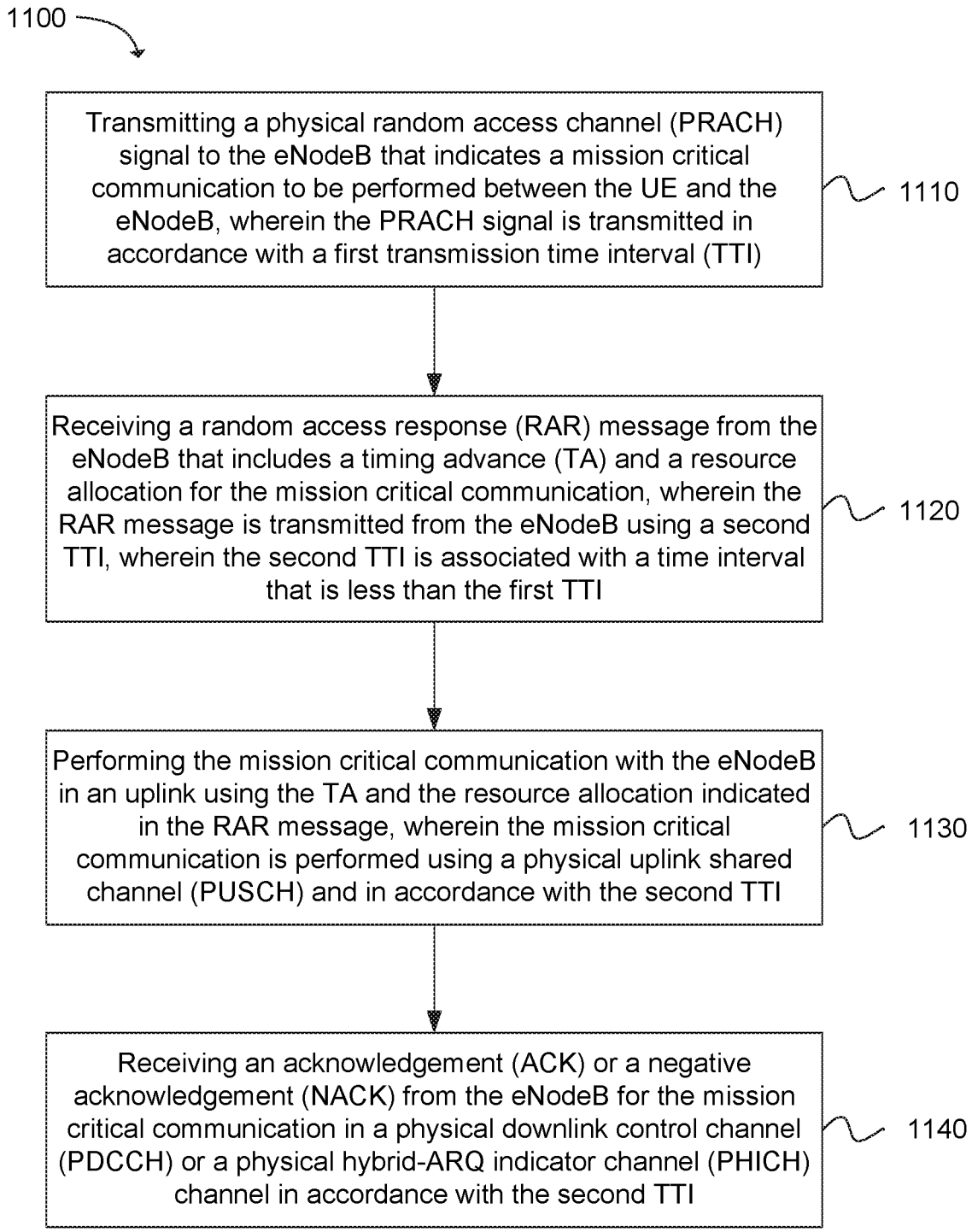
FIG. 11 depicts a flowchart of a machine readable storage medium having instructions embodied thereon for performing mission critical communications between a user equipment (UE) and an eNodeB in accordance with an example.

Another example provides at least one machine readable storage medium having instructions 1100 embodied thereon for performing mission critical communications between a user equipment (UE) and an eNodeB, as shown in the flow chart in FIG. 11. The instructions can be executed on a machine, where the instructions are included on at least one computer readable medium or one non-transitory machine readable storage medium. The instructions when executed perform: transmitting, using at least one processor of the UE, a physical random access channel (PRACH) signal to the eNodeB that indicates a mission critical communication to be performed between the UE and the eNodeB, wherein the PRACH signal is transmitted in accordance with a first transmission time interval (TTI), as in block 1110. The instructions when executed perform: receiving, using the at least one processor of the UE, a random access response (RAR) message from the eNodeB that includes a timing advance (TA) and a resource allocation for the mission critical communication, wherein the RAR message is transmitted from the eNodeB using a second TTI, wherein the second TTI is associated with a time interval that is less than the first TTI, as in block 1120. The instructions when executed perform: performing, using the at least one processor of the UE, the mission critical communication with the eNodeB in an uplink using the TA and the resource allocation indicated in the RAR message, wherein the mission critical communication is performed using a physical uplink shared channel (PUSCH) and in accordance with the second TTI, as in block 1130. The instructions when executed perform: receiving, using the at least one processor of the UE, an acknowledgement (ACK) or a negative acknowledgement (NACK) from the eNodeB for the mission critical communication in a physical downlink control channel (PDCCH) or a physical hybrid-ARQ indicator channel (PHICH) channel in accordance with the second TTI, as in block 1140.

Figure 12:
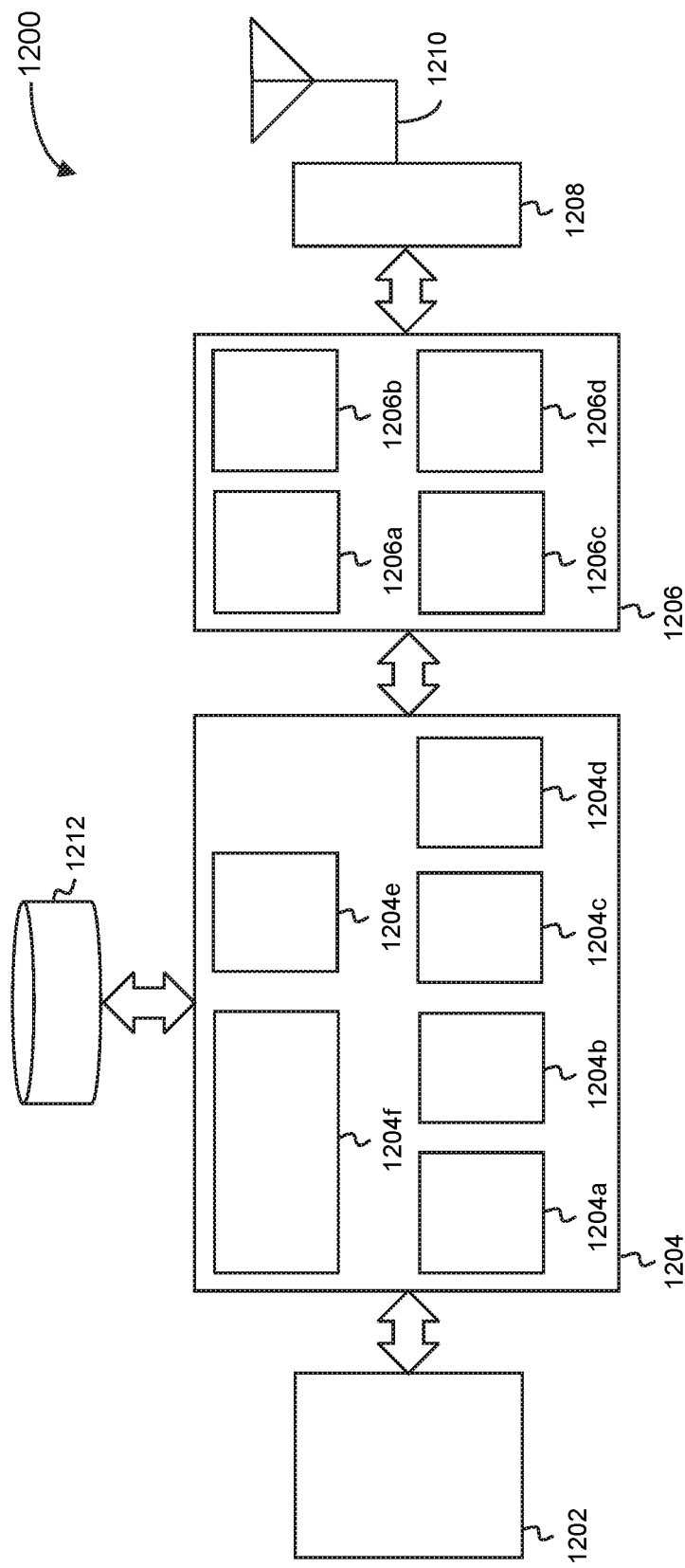
FIG. 12 illustrates a diagram of a wireless device (e.g., UE) in accordance with an example.

FIG. 12 provides an example illustration of a user equipment (UE) device 1200, such as a wireless device, a mobile station (MS), a mobile wireless device, a mobile communication device, a tablet, a handset, or other type of wireless device. The UE device 1200 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 1200 can be configured to communicate using at least one wireless communication standard including 3GPP LTE, WiMAX, High Speed Packet Access (HSPA), Bluetooth, and WiFi. The UE device 1200 can communicate using separate antennas for each wireless communication standard or shared antennas for multiple wireless communication standards. The UE device 1200 can communicate in a wireless local area network (WLAN), a wireless personal area network (WPAN), and/or a WWAN.

In some embodiments, the UE device 1200 may include application circuitry 1202, baseband circuitry 1204, Radio Frequency (RF) circuitry 1206, front-end module (FEM) circuitry 1208 and one or more antennas 1210, coupled together at least as shown.

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 1212, and may be configured to execute instructions stored in the storage medium 1212 to enable various applications and/or operating systems to run on the system.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband processing circuity 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., fifth generation (5G), 6G, etc.). The baseband circuitry 1204 (e.g., one or more of baseband processors 1204a-d) may handle various radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204e of the baseband circuitry 1204 may be configured to run elements of the protocol stack for signaling of the PHY, MAC, RLC, PDCP and/or RRC layers. In some embodiments, the baseband circuitry may include one or more audio digital signal processor(s) (DSP) 1204f The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

The RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206a, amplifier circuitry 1206b and filter circuitry 1206c. The transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c. The filter circuitry 1206c may include a low-pass filter (LPF), although the scope of the embodiments is not limited in this respect.

In some embodiments, the mixer circuitry 1206a of the receive signal path and the mixer circuitry 1206a of the transmit signal path may include two or more mixers and may be arranged for quadrature down-conversion and/or up-conversion respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct down-conversion and/or direct up-conversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

Figure 13:
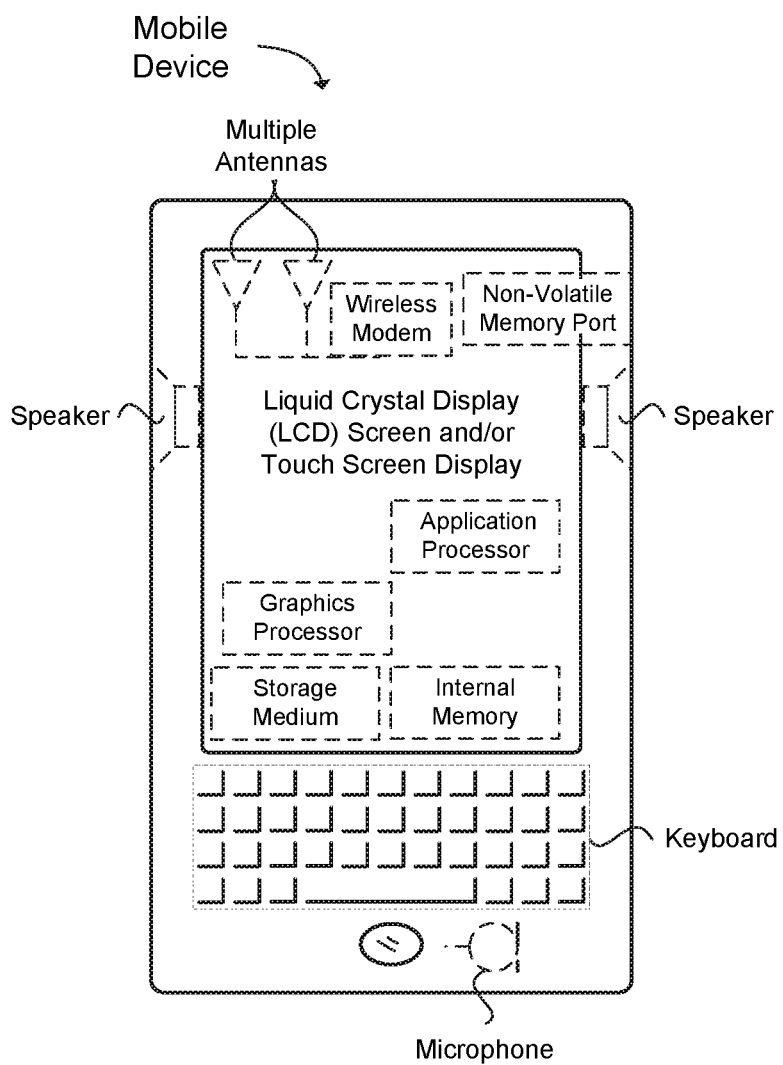
FIG. 13 illustrates a diagram of a wireless device (e.g., UE) in accordance with an example.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to perform mission critical communications with an eNodeB, the apparatus comprising one or more processors and memory configured to: transmit, from the UE to the eNodeB, a physical random access channel (PRACH) signal that indicates a mission critical communication to be performed between the UE and the eNodeB, wherein the PRACH signal is transmitted using dedicated PRACH resources and in accordance with a first transmission time interval (TTI); receive, from the eNodeB, a random access response (RAR) message that includes a timing advance (TA) and a resource allocation for the mission critical communication, wherein the RAR message is transmitted from the eNodeB using a second TTI, wherein the second TTI is associated with a time interval that is less than the first TTI; decode, at the UE, the RAR message to determine the TA and the resource allocation for the mission critical communication; and perform, at the UE, the mission critical communication with the eNodeB in an uplink using the TA and the resource allocation indicated in the RAR message, wherein the mission critical communication is performed using a physical uplink shared channel (PUSCH) and in accordance with the second TTI.

Example 2 includes the apparatus of Example 1, further configured to receive, from the eNodeB, an acknowledgement (ACK) or a negative acknowledgement (NACK) for the mission critical communication in a physical downlink control channel (PDCCH) or a physical hybrid-ARQ indicator channel (PHICH) channel in accordance with the second TTI.

Example 3 includes the apparatus of any of Examples 1-2, wherein the first TTI is for a Third Generation Partnership Project (3GPP) Long Term Evolution (LTE) Release 8 orthogonal frequency division multiple access (OFDMA) frame structure and is approximately one millisecond (ms) and the second TTI is approximately 0.1 to 0.2 ms.

Example 4 includes the apparatus of any of Examples 1-3, wherein the first TTI is associated with a first partition of a low band and the second TTI is associated with a second partition of a low band, wherein the first partition is utilized for non-mission critical communications and the second partition is utilized for mission critical communications.

Example 5 includes the apparatus of any of Examples 1-4, wherein the UE is configured to: perform repeated transmissions of the PRACH signal to the eNodeB until the RAR message is received from the eNodeB; and perform repeated mission critical communications with the eNodeB until an acknowledgement (ACK) or a negative acknowledgement (NACK) is received from the eNodeB, wherein a maximum number of repetitions for each transmission from the UE is predefined or configured by higher layers via one of: a master information block (MIB), a system information block (SIB) or dedicated radio resource control (RRC) signaling, wherein the UE performs a random back off and reinitiates a procedure for performing the mission critical communication when the maximum number of repetitions for a defined transmission is reached.

Example 6 includes the apparatus of any of Examples 1-5, wherein the UE is configured to: repeatedly transmit the PRACH signal to the eNodeB in accordance with a fixed number of repetitions; and repeatedly perform the mission critical communication with the eNodeB in accordance with a fixed number of repetitions, wherein the fixed number of repetitions for each transmission from the UE is predefined or configured by higher layers via one of: a master information block (MIB), a system information block (SIB) or dedicated radio resource control (RRC) signaling.

Example 7 includes the apparatus of any of Examples 1-6, wherein the dedicated PRACH resources for mission critical communications are multiplexed with PRACH resources for non-mission critical application using at least one of: time division multiplexing (TDM), frequency division multiplexing (FDM) and code division multiplexing (CDM).

Example 8 includes the apparatus of any of Examples 1-7, wherein a plurality of signatures, time resources and frequency resources are reserved for transmitting the PRACH signal from the UE to trigger the mission critical communication.

Example 9 includes the apparatus of any of Examples 1-8, wherein the PRACH signal is communicated to the eNodeB with a scheduling request (SR), wherein the SR includes at least one of: a mission critical machine type communication (MTC) device identifier (ID), an event ID, a mission critical MTC device capability, and a resource request and a modulation and coding scheme (MCS) for the mission critical communication in uplink from the UE.

Example 10 includes the apparatus of any of Examples 1-9, wherein the PRACH signal is transmitted from the UE to the eNodeB in accordance with a maximum transmit power.

Example 11 includes the apparatus of any of Examples 1-10, wherein the UE is configured to receive the RAR message from the eNodeB by monitoring a RAR message window, wherein a position of the RAR message window is configured by higher layers via one of: a master information block (MIB), a system information block (SIB) or dedicated radio resource control (RRC) signaling.

Example 12 includes the apparatus of any of Examples 1-11, further configured to receive a preamble from the eNodeB prior to receiving the RAR message, wherein the preamble functions to improve a downlink synchronization accuracy.

Example 13 includes the apparatus of any of Examples 1-12, wherein the RAR message received at the UE includes at least one of: the timing advance (TA), an uplink grant that contains the resource allocation for the mission critical communication, a mission critical machine type communication (MTC) device identifier (ID), an event ID, and a random access preamble ID.

Example 14 includes the apparatus of any of Examples 1-13, wherein: the RAR message is received at the UE via a physical downlink control channel (PDCCH), wherein the UE is configured to monitor the PDCCH using a cyclic redundancy check (CRC) scrambled by a random-access radio network temporary identifier (RA-RNTI); or the RAR message is received at the UE via a physical downlink shared channel (PDSCH) that is scheduled by the PDCCH.

Example 15 includes the apparatus of any of Examples 1-14, wherein: a gap between a last subframe for a RAR message transmission and a starting subframe of the mission critical communication in uplink is predefined or configured by higher layers via one of: a master information block (MIB), a system information block (SIB) or dedicated radio resource control (RRC) signaling; and a gap between a last subframe of the mission critical communication in uplink and a starting subframe of an acknowledgement (ACK) or a negative acknowledgement (NACK) transmission is predefined or configured by higher layers via one of: the MIB, the SIB, or dedicated RRC signaling.

Example 16 includes the apparatus of any of Examples 1-15, wherein the UE includes at least one of an antenna, a touch sensitive display screen, a speaker, a microphone, a graphics processor, an application processor, a baseband processor, an internal memory, a non-volatile memory port, and combinations thereof.

Example 17 includes an apparatus of a base station operable to receive mission critical communications from a user equipment (UE), the apparatus comprising one or more processors and memory configured to: receive, from the UE, a physical random access channel (PRACH) signal that indicates a mission critical communication to be performed between the eNodeB and the UE, wherein the PRACH signal is received using dedicated PRACH resources and in accordance with a first transmission time interval (TTI); transmit, to the UE, a random access response (RAR) message that includes a timing advance (TA) and a resource allocation for the mission critical communication, wherein the RAR message is transmitted from the eNodeB using a second TTI, wherein the second TTI is associated with a time interval that is less than the first TTI; receive, from the UE, the mission critical communication on a physical uplink shared channel (PUSCH) and in accordance with the second TTI, wherein the UE is configured to perform the mission critical communication in an uplink using the TA and the resource allocation indicated in the RAR message; and transmit, to the UE, an acknowledgement (ACK) or a negative acknowledgement (NACK) for the mission critical communication in a physical downlink control channel (PDCCH) or a physical hybrid-ARQ indicator channel (PHICH) channel in accordance with the second TTI.

Example 18 includes the apparatus of Example 17, wherein the first TTI is for a Third Generation Partnership Project (3GPP) Long Term Evolution (LTE) Release 8 orthogonal frequency division multiple access (OFDMA) frame structure and is approximately one millisecond (ms) and is associated with a first partition of a low band, wherein the second TTI is approximately 0.1 to 0.2 ms and is associated with a second partition of a low band, wherein the first partition is utilized for non-mission critical communications and the second partition is utilized for mission critical communications.

Example 19 includes the apparatus of any of Examples 17-18, wherein the dedicated PRACH resources for mission critical communications are multiplexed with PRACH resources for non-mission critical application using at least one of: time division multiplexing (TDM), frequency division multiplexing (FDM) and code division multiplexing (CDM).

Example 20 includes the apparatus of any of Examples 17-19, wherein: the PRACH signal is received from the UE with a scheduling request (SR), wherein the SR includes at least one of: a mission critical machine type communication (MTC) device identifier (ID), an event ID, a mission critical MTC device capability, and a resource request and a modulation and coding scheme (MCS) for the mission critical communication in uplink from the UE; and the RAR message transmitted to the UE includes at least one of: the timing advance (TA), an uplink grant that contains the resource allocation for the mission critical communication, a mission critical machine type communication (MTC) device identifier (ID), an event ID, and a random access preamble ID.

Example 21 includes the apparatus of any of Examples 17-20, wherein the RAR message is transmitted to the UE via a physical downlink control channel (PDCCH) or a physical downlink shared channel (PDSCH).

Example 22 includes at least one machine readable storage medium having instructions embodied thereon for performing mission critical communications between a user equipment (UE) and an eNodeB, the instructions when executed perform the following: transmitting, using at least one processor of the UE, a physical random access channel (PRACH) signal to the eNodeB that indicates a mission critical communication to be performed between the UE and the eNodeB, wherein the PRACH signal is transmitted in accordance with a first transmission time interval (TTI); receiving, using the at least one processor of the UE, a random access response (RAR) message from the eNodeB that includes a timing advance (TA) and a resource allocation for the mission critical communication, wherein the RAR message is transmitted from the eNodeB using a second TTI, wherein the second TTI is associated with a time interval that is less than the first TTI; performing, using the at least one processor of the UE, the mission critical communication with the eNodeB in an uplink using the TA and the resource allocation indicated in the RAR message, wherein the mission critical communication is performed using a physical uplink shared channel (PUSCH) and in accordance with the second TTI; and receiving, using the at least one processor of the UE, an acknowledgement (ACK) or a negative acknowledgement (NACK) from the eNodeB for the mission critical communication in a physical downlink control channel (PDCCH) or a physical hybrid-ARQ indicator channel (PHICH) channel in accordance with the second TTI.

Example 23 includes the at least one machine readable storage medium of Example 22, wherein the UE is configured to initiate performance of the mission critical communication when in a radio resource control (RRC) idle mode.

Example 24 includes the at least one machine readable storage medium of any of Examples 22-23, wherein the first TTI is approximately one millisecond (ms) and is associated with a first partition of a low band, wherein the second TTI is approximately 0.1 to 0.2 ms and is associated with a second partition of a low band, wherein the first partition is utilized for non-mission critical communications and the second partition is utilized for mission critical communications.

Example 25 includes the at least one machine readable storage medium of any of Examples 22-24, further comprising instructions which when executed perform the following: performing repeated transmissions of the repeatedly transmit the PRACH signal to the eNodeB until the RAR message is received from the eNodeB; and performing repeated mission critical communications with the eNodeB until an acknowledgement (ACK) or a negative acknowledgement (NACK) is received from the eNodeB.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to perform mission critical communications with an eNodeB, the apparatus comprising one or more processors and memory configured to:
transmit, from the UE to the eNodeB, a physical random access channel (PRACH) signal that indicates a mission critical communication to be performed between the UE and the eNodeB, wherein the PRACH signal is transmitted using dedicated PRACH resources and in accordance with a first transmission time interval (TTI), wherein the PRACH signal is communicated to the eNodeB with a scheduling request (SR) that includes an event ID indicating an access cause;
receive, from the eNodeB, a random access response (RAR) message that includes a timing advance (TA) and a resource allocation for the mission critical communication, wherein the RAR message is transmitted from the eNodeB using a second TTI, wherein the second TTI is associated with a time interval that is less than the first TTI;
decode, at the UE, the RAR message to determine the TA and the resource allocation for the mission critical communication; and perform, at the UE, the mission critical communication with the eNodeB in an uplink using the TA and the resource allocation indicated in the RAR message, wherein the mission critical communication is performed using a physical uplink shared channel (PUSCH) and in accordance with the second TTI.

2. The apparatus of claim 1, further configured to receive, from the eNodeB, an acknowledgement (ACK) or a negative acknowledgement (NACK) for the mission critical communication in a physical downlink control channel (PDCCH) or a physical hybrid-ARQ indicator channel (PRICH) channel in accordance with the second TTI.

3. The apparatus of claim 1, wherein the first TTI is for a Third Generation Partnership Project (3GPP) Long Term Evolution (LTE) Release 8 orthogonal frequency division multiple access (OFDMA) frame structure and is approximately one millisecond (ms) and the second TTI is approximately 0.1 to 0.2 ms.

4. The apparatus of claim 1, wherein the first TTI is associated with a first partition of a low band and the second TTI is associated with a second partition of a low band, wherein the first partition is utilized for non-mission critical communications and the second partition is utilized for mission critical communications.

5. The apparatus of claim 1, wherein the UE is configured to: perform repeated transmissions of the PRACH signal to the eNodeB until the RAR message is received from the eNodeB; and
perform repeated mission critical communications with the eNodeB until an acknowledgement (ACK) or a negative acknowledgement (NACK) is received from the eNodeB,
wherein a maximum number of repetitions for each transmission from the UE is predefined or configured by higher layers via one of: a master information block (MIB), a system information block (SIB) or dedicated radio resource control (RRC) signaling,
wherein the UE performs a random back off and reinitiates a procedure for performing the mission critical communication when the maximum number of repetitions for a defined transmission is reached.

6. The apparatus of claim 1, wherein the UE is configured to:
repeatedly transmit the PRACH signal to the eNodeB in accordance with a fixed number of repetitions; and
repeatedly perform the mission critical communication with the eNodeB in accordance with a fixed number of repetitions,
wherein the fixed number of repetitions for each transmission from the UE is predefined or configured by higher layers via one of: a master information block (MIB), a system information block (SIB) or dedicated radio resource control (RRC) signaling.

7. The apparatus of claim 1, wherein the dedicated PRACH resources for mission critical communications are multiplexed with PRACH resources for non-mission critical application using at least one of: time division multiplexing (TDM), frequency division multiplexing (FDM) and code division multiplexing (CDM).

8. The apparatus of claim 1, wherein a plurality of signatures, time resources and frequency resources are reserved for transmitting the PRACH signal from the UE to trigger the mission critical communication.

9. The apparatus of claim 1, wherein the SR further includes at least one of: a mission critical machine type communication (MTC) device identifier (ID), a mission critical MTC device capability, and a resource request and a modulation and coding scheme (MCS) for the mission critical communication in uplink from the UE.

10. The apparatus of claim 1, wherein the PRACH signal is transmitted from the UE to the eNodeB in accordance with a maximum transmit power.

11. The apparatus of claim 1, wherein the UE is configured to receive the RAR message from the eNodeB by monitoring a RAR message window, wherein a position of the RAR message window is configured by higher layers via one of: a master information block (MIB), a system information block (SIB) or dedicated radio resource control (RRC) signaling.

12. The apparatus of claim 1, further configured to receive a preamble from the eNodeB prior to receiving the RAR message, wherein the preamble functions to improve a downlink synchronization accuracy.

13. The apparatus of claim 1, wherein the RAR message received at the UE includes at least one of: the timing advance (TA), an uplink grant that contains the resource allocation for the mission critical communication, a mission critical machine type communication (MTC) device identifier (ID), an event ID, and a random access preamble ID.

14. The apparatus of claim 1, wherein:
the RAR message is received at the UE via a physical downlink control channel (PDCCH), wherein the UE is configured to monitor the PDCCH using a cyclic redundancy check (CRC) scrambled by a random-access radio network temporary identifier (RA-RNTI); or
the RAR message is received at the UE via a physical downlink shared channel (PDSCH) that is scheduled by the PDCCH.

15. The apparatus of claim 1, wherein:
a gap between a last subframe for a RAR message transmission and a starting subframe of the mission critical communication in uplink is predefined or configured by higher layers via one of: a master information block (MIB), a system information block (SIB) or dedicated radio resource control (RRC) signaling; and
a gap between a last subframe of the mission critical communication in uplink and a starting subframe of an acknowledgement (ACK) or a negative acknowledgement (NACK) transmission is predefined or configured by higher layers via one of: the MIB, the SIB, or dedicated RRC signaling.

16. The apparatus of claim 1, wherein the UE includes at least one of an antenna, a touch sensitive display screen, a speaker, a microphone, a graphics processor, an application processor, a baseband processor, an internal memory, a non volatile memory port, and combinations thereof.

17. An apparatus of a base station operable to receive mission critical communications from a user equipment (UE), the apparatus comprising one or more processors and memory configured to:
receive, from the UE, a physical random access channel (PRACH) signal that indicates a mission critical communication to be performed between the eNodeB and the UE, wherein the PRACH signal is received using dedicated PRACH resources and in accordance with a first transmission time interval (TTI);
transmit, to the UE, a random access response (RAR) message that includes a timing advance (TA) and a resource allocation for the mission critical communication, wherein the RAR message is transmitted from the eNodeB using a second TTI, wherein the second TTI is associated with a time interval that is less than the first TTI;

receive, from the UE, the mission critical communication on a physical uplink shared channel (PUSCH) and in accordance with the second TTI, wherein the UE is configured to perform the mission critical communication in an uplink using the TA and the resource allocation indicated in the RAR message;

transmit, to the UE, an acknowledgement (ACK) or a negative acknowledgement (NACK) for the mission critical communication in a physical downlink control channel (PDCCH) or a physical hybrid-ARQ indicator channel (PRICH) channel in accordance with the second TTI.

18. The apparatus of claim 17, wherein the first TTI is for a Third Generation Partnership Project (3GPP) Long Term Evolution (LTE) Release 8 orthogonal frequency division multiple access (OFDMA) frame structure and is approximately one millisecond (ms) and is associated with a first partition of a low band, wherein the second TTI is approximately 0.1 to 0.2 ms and is associated with a second partition of a low band, wherein the first partition is utilized for non-mission critical communications and the second partition is utilized for mission critical communications.

19. The apparatus of claim 17, wherein the dedicated PRACH resources for mission critical communications are multiplexed with PRACH resources for non-mission critical application using at least one of: time division multiplexing (TDM), frequency division multiplexing (FDM) and code division multiplexing (CDM).

20. The apparatus of claim 17, wherein:
the PRACH signal is received from the UE with a scheduling request (SR), wherein the SR includes at least one of: a mission critical machine type communication (MTC) device identifier (ID), an event ID, a mission critical MTC device capability, and a resource request and a modulation and coding scheme (MCS) for the mission critical communication in uplink from the UE; and
the RAR message transmitted to the UE includes at least one of: the timing advance (TA), an uplink grant that contains the resource allocation for the mission critical communication, a mission critical machine type communication (MTC) device identifier (ID), an event ID, and a random access preamble ID.

21. The apparatus of claim 17, wherein the RAR message is transmitted to the UE via a physical downlink control channel (PDCCH) or a physical downlink shared channel (PDSCH).

22. At least one non-transitory machine readable storage medium having instructions embodied thereon for performing mission critical communications between a user equipment (UE) and an eNodeB, the instructions when executed perform the following:

transmitting, using at least one processor of the UE, a physical random access channel (PRACH) signal to the eNodeB that indicates a mission critical communication to be performed between the UE and the eNodeB, wherein the PRACH signal is transmitted in accordance with a first transmission time interval (TTI);

receiving, using the at least one processor of the UE, a random access response (RAR) message from the eNodeB that includes a timing advance (TA) and a resource allocation for the mission critical communication, wherein the RAR message is transmitted from the eNodeB using a second TTI, wherein the second TTI is associated with a time interval that is less than the first TTI;

performing, using the at least one processor of the UE, the mission critical communication with the eNodeB in an uplink using the TA and the resource allocation indicated in the RAR message, wherein the mission critical communication is performed using a physical uplink shared channel (PUSCH) and in accordance with the second TTI; and receiving, using the at least one processor of the UE, an acknowledgement (ACK) or a negative acknowledgement (NACK) from the eNodeB for the mission critical communication in a physical downlink control channel (PDCCH) or a physical hybrid ARQ indicator channel (PRICH) channel in accordance with the second TTI.

23. The at least one non-transitory machine readable storage medium of claim 22, wherein the UE is configured to initiate performance of the mission critical communication when in a radio resource control (RRC) idle mode.

24. The at least one non-transitory machine readable storage medium of claim 22, wherein the first TTI is approximately one millisecond (ms) and is associated with a first partition of a low band, wherein the second TTI is approximately 0.1 to 0.2 ms and is associated with a second partition of a low band, wherein the first partition is utilized for non-mission critical communications and the second partition is utilized for mission critical communications.

25. The at least one non-transitory machine readable storage medium of claim 22, further comprising instructions which when executed perform the following:
performing repeated transmissions of the PRACH signal to the eNodeB until the RAR message is received from the eNodeB; and
performing repeated mission critical communications with the eNodeB until an acknowledgement (ACK) or a negative acknowledgement (NACK) is received from the eNodeB.

\* \* \* \* \*